Figure 6:
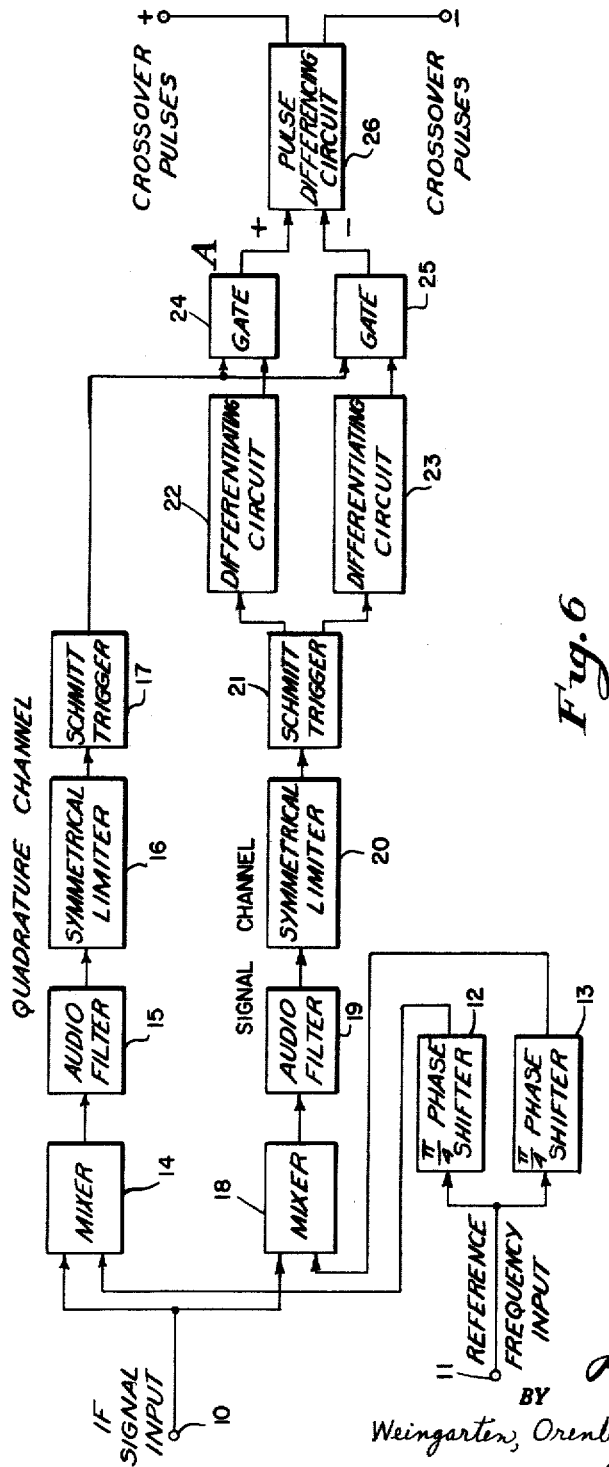

June 18, 1963   R. S. SMITH   3,094,666
QUADRATURE AXIS-CROSSING COUNTER
Filed May 1, 1961   4 Sheets-Sheet 1
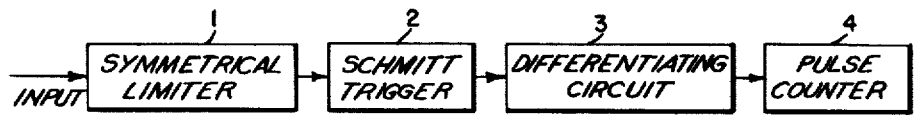
*Fig. 1*
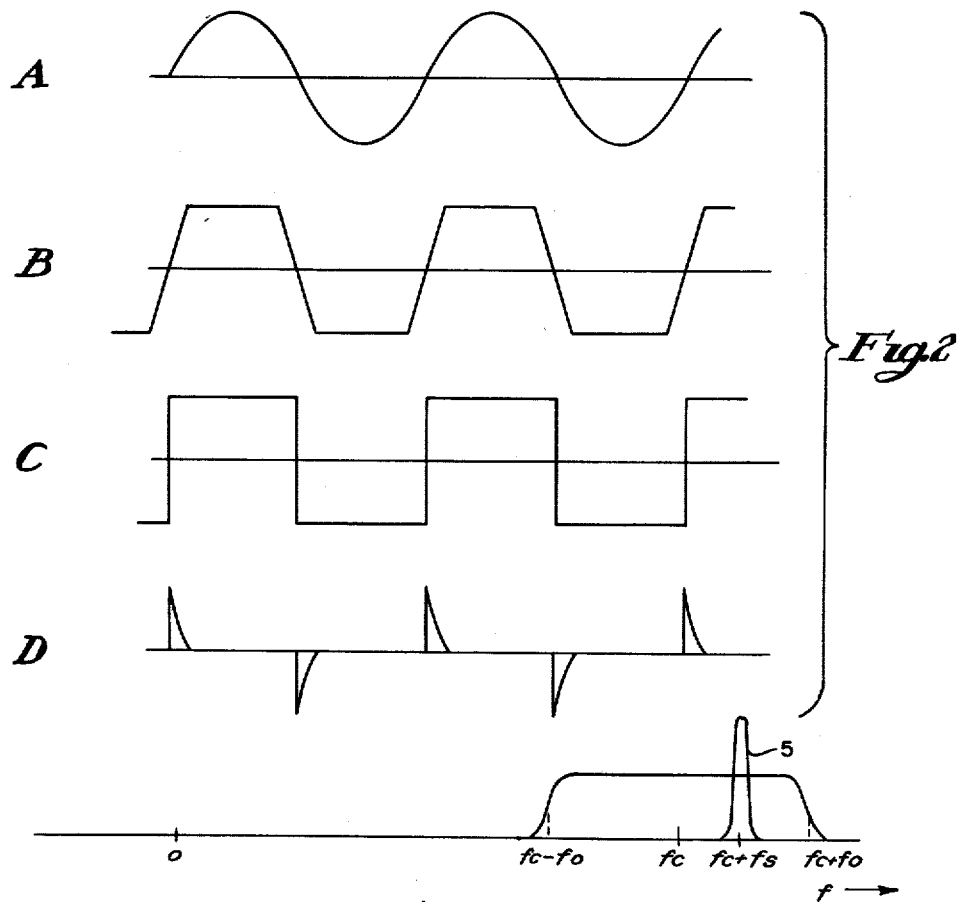
*Fig. 2*
*Fig. 3*
*Fig. 4*
INVENTOR.
BY *Roger S. Smith*
Weingarten, Orenbuch, & Pandiscio
*Attorneys*

June 18, 1963   R. S. SMITH   3,094,666
QUADRATURE AXIS-CROSSING COUNTER
Filed May 1, 1961   4 Sheets-Sheet 2
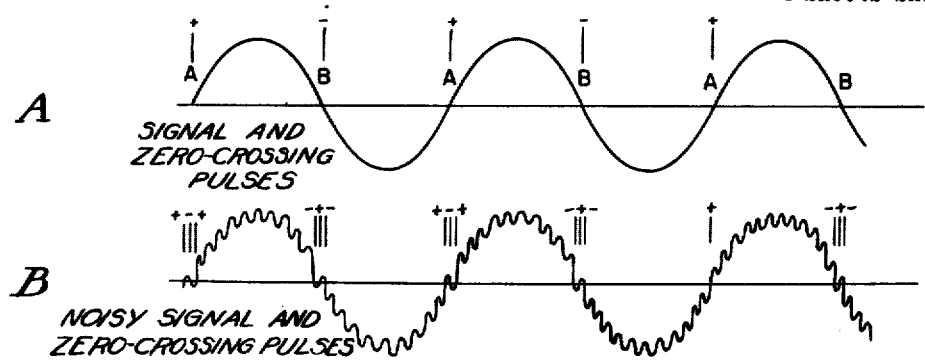
Fig. 5
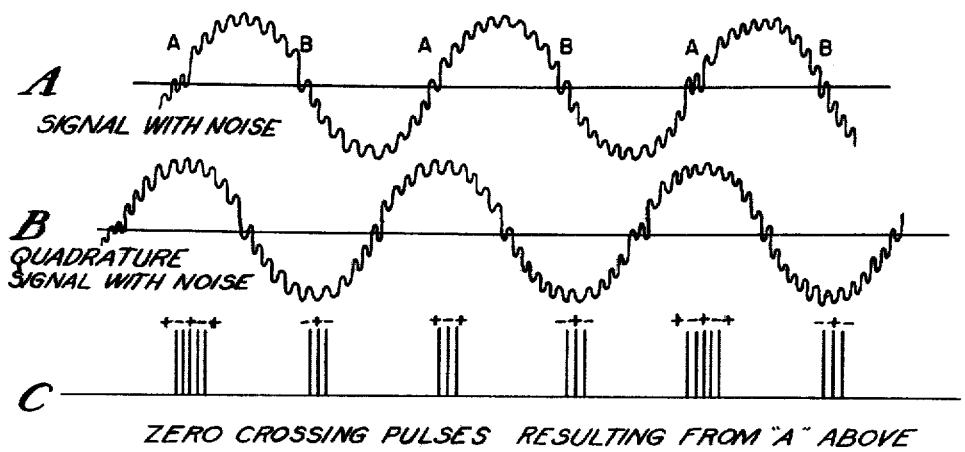
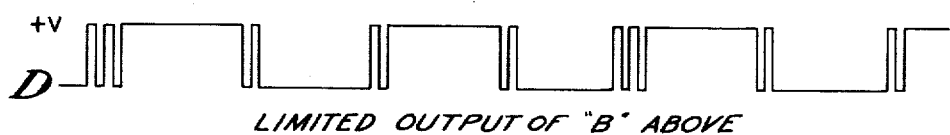
Fig. 7   OPERATION OF QUADRATURE ZERO-CROSSING COUNTER
INVENTOR.
Roger S. Smith
BY Weingarten,
Orenbuch, & Pandiscio
Attorneys June 18, 1963   R. S. SMITH   3,094,666
QUADRATURE AXIS-CROSSING COUNTER
Filed May 1, 1961   4 Sheets-Sheet 4

INVENTOR.
Roger S. Smith
BY
Weingarten, Orenbuch, & Pandiscio
Attorneys

United States Patent Office 3,094,666
Patented June 18, 1963

3,094,666
QUADRATURE AXIS-CROSSING COUNTER
Roger S. Smith, North Andover, Mass., assignor to Laboratory for Electronics, Inc., Boston, Mass., a corporation of Delaware
Filed May 1, 1961, Ser. No. 106,901
4 Claims. (Cl. 328—108)

This invention relates in general to apparatus for determining the frequency of an unknown signal and more particularly pertains to an improvement upon axis-crossing counters which makes those counters usable though the unknown signal is accompanied by a relatively large amount of noise.

The conventional axis-crossing counter is a simple and reliable device for determining the frequency of an input signal. That counter has been widely employed to measure the frequency of spectrally pure signals in a noiseless environment. The use of the conventional axis-crossing counter in a non-ideal environment has been limited by the counter's poor performance when the signal, whose frequency is to be determined, is accompanied by noise. In the axis-crossing counter, the input signal is limited to obtain a more rectangular wave train, the wave train is differentiated to obtain pulses indicating when the input signal had crossed the zero axis, and the resulting pulse output is counted for a specific period of time to determine the input signal's frequency. The erratic performance of the conventional axis-crossing detector, when the input signal is accompanied by noise, is due to the counter's inability to distinguish between a zero crossing of the signal and a zero crossing due to noise accompanying the signal.

The invention resides in an improved axis-crossing counter which is able to disregard the axis crossings due to noise accompanying the signal and count those crossings due to the signal alone. The invention employs apparatus for deriving from the input signal whose frequency is to be determined an identical signal in phase quadrature with the input signal. The quadrature signal is utilized in a quadrature channel to obtain a signal controlling a pair of gates. The input signal is applied through a symmetrical limiter to a Schmitt trigger circuit providing a pair of oppositely phased outputs. The outputs of the Schmitt trigger are differentiated to obtain pulses indicative of positive slope and negative slope axis crossings due both to the true axis crossings of the input signal and the spurious axis crossings caused by noise accompanying the input signal. The positive slope crossover pulses are applied to one of the gates and the negative slope crossover pulses are applied to the other of those gates. The gates pass the crossover pulses to the input lines of a pulse differencing circuit only during the interval when those gates are enabled by a signal from the quadrature channel. The gates are enabled for approximately one half the period of the input signal whose frequency is to be determined. Because the gating waveform is derived from the phase quadrature signal, the gating signal is centered in the vicinity either of the input signal's true positive slope axis crossing or of the input signal's true negative slope axis crossing, depending upon whether the quadrature signal lags or leads the input signal. The crossover pulses passing through the enabled gates are counted by the pulse differencing circuit in a manner yielding an output which is the difference between the pulses applied to one input line of that circuit and the pulses applied to its other input line. The output of the pulse differencing circuit may then be counted by a conventional device to determine the frequency of the input signal.

Figure 8:
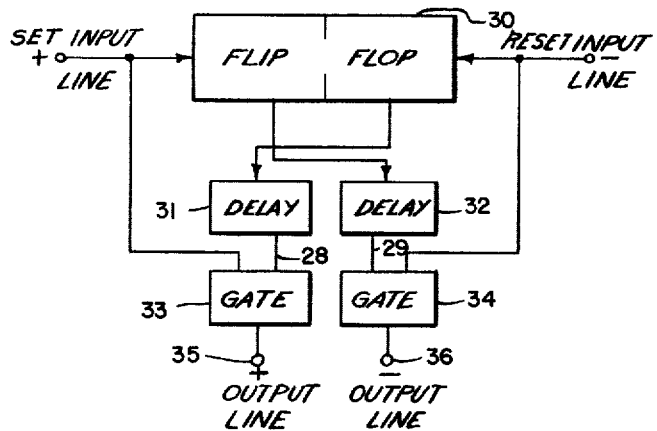
Figure 9:
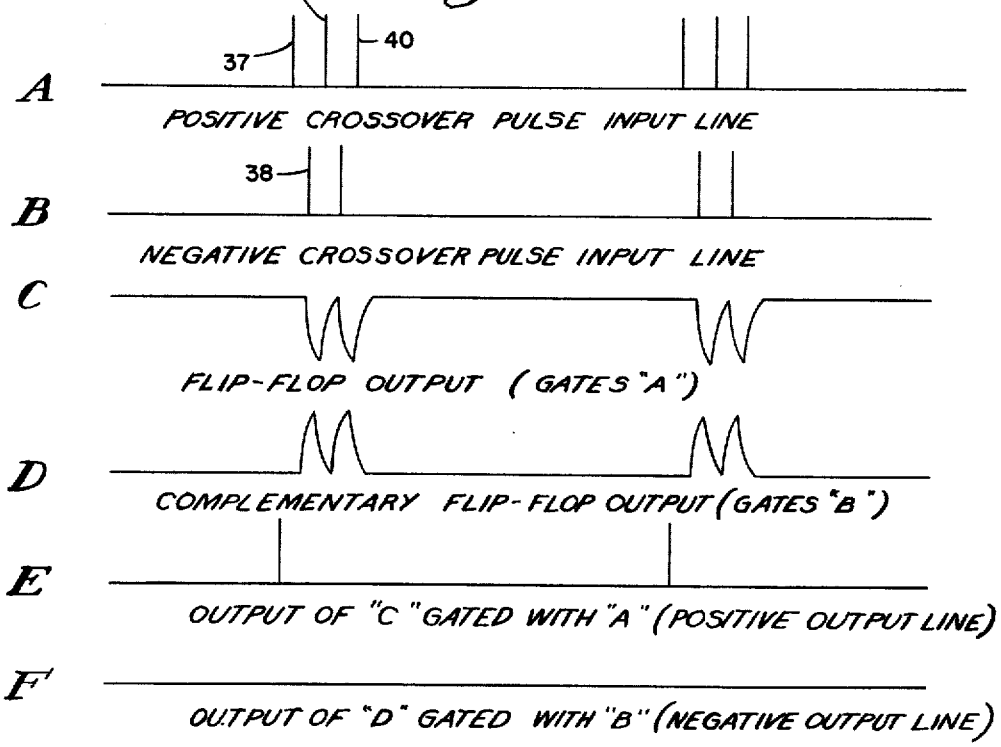

The invention, both as to its organization and mode of operation, can be better apprehended by a perusal of the following exposition when considered in conjunction with the accompanying drawings wherein:

FIG. 1 depicts the schematic arrangement of a conventional axis-crossing detector;
FIG. 2 are waveforms pertaining to the conventional axis-crossing detector;
FIGS. 3 and 4 represent the type of signals intended to be accommodated by the invention;
FIG. 5 illustrates the effect caused by noise accompanying a signal applied to the input of a conventional axis-crossing detector;
FIG. 6 illustrates in schematic form a preferred embodiment of the invention;
FIG. 7 displays waveforms occurring in the operation of the preferred embodiment of FIG. 6;
FIG. 8 shows a pulse differencing device; and
FIG. 9 depicts waveforms pertaining to the operation of the pulse differencing device.

A simplified block diagram of a conventional axis-crossing counter is shown in FIG. 1. The input signal, assumed to be the sinusoidal waves of FIG. 2A, is applied to the input of symmetrical limiter 1. The extreme positive and negative excursions of the input signal are removed by the limiter to yield the more rectangular waves of FIG. 2B at the limiter's output. In order to further shape the signal, the output of the symmetrical limiter is fed into a Schmitt trigger circuit 2. A Schmitt trigger is a regenerative bistable circuit whose state depends on the amplitude of the input voltage. As the input rises to a critical voltage, the Schmitt trigger circuit changes from one stable state to the other; if the input voltage is now lowered to another critical value, the trigger circuit returns to its original state. Because of its operational characteristics, the Schmitt trigger circuit is useful for squaring sinusoidal or non-rectangular inputs as indicated by the output of that circuit depicted in FIG. 2C. The square wave output of the Schmitt trigger is differentiated in the differentiator 3 to obtain the positive and negative pulses of FIG. 2D. The differentiated pulses correspond in time and polarity to the positive slope and negative slope zero axis crossings of the input waveform. The positive pulses indicate when the input sinusoidal wave has passed from negative polarity through the zero axis to positive polarity whereas the negative pulses indicate when the wave has crossed the zero axis in the opposite manner. It is not necessary to count both negative and positive pulses since the total of both yields a count double the frequency of the input signal. By employing a pulse counter 4 to total the number of positive pulses or the total of the negative pulses which occur in a specific time interval, the mean frequency of the input signal is determined.

In order to illustrate the measurement problem, the general case of an intermediate frequency (IF) signal accompanied by noise is here considered. The general characteristic of the IF signal 5 in its noise environment is depicted in FIG. 3. The bandwidth of interest has a center frequency $f_c$ and the IF signal may be located anywhere between the lowermost frequency $f_c - f_0$ and the uppermost frequency $f_c + f_0$. The noise is assumed to be filtered white noise, and therefore its spectrum extends across the entire bandwidth. The IF signal is assumed to be of an arbitrary spectral width and shape and its center frequency, $f_s$, is to be determined by the axis-crossing counter. In the ideal case, the IF signal would be a pure sine wave signal having a frequency $f_s$. When the IF signal of FIG. 3 is heterodyned with a signal of frequency $f_c$, the audio spectrum shown in FIG. 4 is obtained. Although the bandwidth in the IF range has been shown in FIG. 3 as having a desired shape, the shaping is more easily accomplished in the audio frequency range because of the lower component Q's required in the shaping filter for that range. The presence of noise with the audio signal 6 results in the noise appearing as a higher interfering frequency to the audio signal for all audio signals less than approximately one-half the upper cut-off frequency of the noise bandwidth $f_o$. In the absence of the interfering noise, the audio signal appears as shown in FIG. 5A with only one positive crossover in each "A" time slot and no positive crossover in the "B" time slots. The presence of noise with the audio signal superimposes a higher frequency on the audio signal, as shown in FIG. 5B, thereby causing extra positive crossovers to appear. Thus, if the conventional axis-crossing counter were to count only the positive crossovers, a measured frequency would result which is three times higher than the actual signal frequency. It thus may be appreciated that for low signal frequencies, the noise need have a relatively small amplitude and yet cause considerable errors in the frequency count. A close inspection of FIG. 5B reveals that if each positive-going crossover yields a positive pulse and each negative-going crossover yields a negative pulse, there is always one net positive pulse in the "A" time slot and one net negative pulse in the "B" time slot. The invention makes use of this result to derive an output pulse train which effectively responds only to the net pulses.

The block diagram of FIG. 6 schematically illustrates one embodiment of the invention employing a signal channel and a quadrature channel having a common signal input terminal 10 at which is impressed the signal whose frequency is to be measured. In this instance, the input signal is assumed to be in the IF range and is accompanied by noise. Each channel has a mixer for heterodyning the IF input signal with a reference frequency signal applied at terminal 11. The reference frequency signal is first passed through phase shifters 12 and 13 to obtain two components having the same frequency but differing in phase by 90°. Phase shifters 12 and 13 are arranged so that one phase shifter causes a 45° phase shift in one direction while the other phase shifter introduces a 45° phase shift in the opposite direction. The audio outputs of the two mixers are, therefore in phase quadrature. The actual method of deriving the quadrature audio signals is immaterial to the invention, and one could readily employ one 90° phase shifter in place of the two 45° phase shifters which are illustrated. In the quadrature channel, the phase shifted reference frequency signal and the IF input signal are heterodyned in a mixer 14 to move the input signal into the audio frequency range. The mixer's output is fed into an audio filter 15 which determines the shape of the pass band. Preferably, the filter is of the low pass type. The audio filter's output may, if it is of sufficient strength, be applied to the input of a symmetrical limiter 16, or if the filter's signal is weak, it may be amplified and then applied to the symmetrical limiter. The symmetrical limiter functions to convert its input into a somewhat rectangular pulse train and that train, in turn, is applied to Schmitt trigger 17. The signal channel is similar to the quadrature channel in that it has a mixer 18 for heterodyning the IF input signal with a reference frequency signal, an audio filter 19 deriving its input from the mixer, a symmetrical limiter 20 coupled to the audio filter, and a Schmitt trigger 21 controlled by the limiter's output. The signal channel, however, has differentiators 22 and 23 connected to the Schmitt trigger's output whereas the Schmitt trigger in the quadrature channel has its output applied directly to gates 24 and 25. The differentiator 22 has its output coupled to gate 24 whereas differentiator 23 has its output coupled to gate 25. The output of each of those gates is fed into a pulse differencing circuit 26 whose operation is discussed below.

The waveforms shown in FIG. 7 are pertinent to the operation of the quadrature axis-crossing detector of FIG. 6. FIG. 7A depicts a noisy signal whose frequency is to be measured, and FIG. 7B depicts the same noisy signal advanced in phase by 90° and thus in quadrature with the signal of FIG. 7A. The waveform of FIG. 7A represents the signal obtained from audio filter 19 whereas the waveform of FIG. 7B represents the signal obtained from audio filter 15 in the quadrature channel. It will be noted that shifting the two components of the reference frequency signal so that they differ in phase by 90° has resulted in the audio outputs of mixers 14 and 18 being in phase quadrature. The phase response characteristics of the audio filters 15 and 19 should be identical to preserve the quadrature relationship between channels. The Schmitt trigger output in the signal channel provides two outputs, one of which is inverted in phase with respect to the other. One output of Schmitt trigger 21 is impressed on differentiator 22 to obtain pulses at positive crossovers and the other output of the Schmitt trigger is impressed on differentiator 23 to obtain pulses at negative crossovers. Thus, the pulses marked + in FIG. 7C represent the output of differentiator 22 and the pulses marked − represent the output of differentiator 23 resulting from the waveform of FIG. 7A. Both differentiators 22 and 23 give out positive pulses, but the pulses of differentiator 23 corresponds to negative slope axis crossings of the waveform of FIG. 7A, whereas the pulse of differentiator 23 correspond to negative slope axis crossings of that waveform. FIG. 7D represents the output of Schmitt trigger 17 in the quadrature channel resulting from the signal of FIG. 7B after that noisy waveform has been limited and fed into the Schmitt trigger. The output of Schmitt trigger 17 is employed to control the gates 24 and 25, those gates being enabled only when the waveform of FIG. 7D is at the +V level. When enabled, the pulses from differentiators 22 and 23 are transmitted through their respective gates to the pulse differencing circuit 26. The result of enabling gates 24 and 25 with the waveform of FIG. 7D is that only the pulses of FIG. 7E appear at the inputs to the pulse differencing circuit. By comparing FIGS. 7A, 7C, and 7E, it can be seen that the pulses in FIG. 7C occurring only in the "A" time slots pass through gates 24 and 25 and appear in the FIG. 7E input to the pulse differencing circuit; those crossover pulses occurring during the "B" time slots are blocked by the gates. The pulse differencing circuit provides an output, depicted in FIG. 7F, yielding one "out" pulse for each group of pulses applied to its input lines. This is the condition necessary for zero error in the measured output frequency.

Pulse differencing circuit 26 is shown in greater detail in FIG. 8. That circuit consists of a flip-flop 30 whose outputs are coupled through delay networks 31 and 32 to respective gates 33 and 34. The "set" input of the flip-flop is coupled to gate 33, whereas the flip-flop's "reset" input is coupled to gate 34. The operation of the pulse differencing circuit can be better understood by considering the waveforms of FIG. 9. Initially, assume that the positive crossover pulses of FIG. 9A are impressed on the set input and the negative crossover pulses of FIG. 9B are impressed on the reset input. Also, assume that flip-flop 30 is in the "set" state enabling gate 33 to pass positive crossover pulses impressed on the "set" input to + output terminal 35. FIG. 9C indicates the output of flip-flop 30 appearing on line 28 whereas FIG. 9D depicts the complementary output of flip-flop 30 appearing on line 29. The first positive pulse 37, FIG. 9A, on the "set" input does not affect the flip-flop since that device is already in the "set" state and that pulse, therefore, passes through gate 33 to output terminal 35. FIGS. 9C and 9D show that the outputs of the flip-flop remain unchanged. The next occurring crossover pulse is pulse 38 of FIG. 9B. Pulse 38 appears on the "reset" line and causes the flip-flop to change its stable state. Gate 34 is initially inhibited, however, and because delay network 32 retards the enable signal from flip-flop 30, pulse 38 decays before gate 34 is enabled and no output signal appears at terminal 36. The next positive pulse 39, FIG. 9A, changes the flip-flop from its "reset" state to its "set" state, but the pulse itself is not gated to output terminal 35 because of the delay caused by network 31 in the transmission of the "enable" signal. Since the "set" and "reset" pulses alternate, this sequence of operation is repeated until the last pulse 40 in the group leaves the flip-flop in the original "set" state. Only the first positive pulse, 37, therefore, appears at the output; all the other pulses effectively being cancelled. FIG. 9E depicts the output at terminal 35, and FIG. 9F depicts the output at terminal 36. It can be observed that only pulse 37 appears in FIG. 9E, the other pulses in the first group in FIGS. 9A and 9B failing to appear in the output of the pulse differencing circuit.

The pulse differencing circuit is a device which, in effect, subtracts the number of pulses on one input line from the number of pulses on the other input line. As there is one net positive pulse in each "A" time period and the pulses on the two input lines must alternate, the positive output line of the pulse differencing circuit provides only one pulse for each "A" time interval. That output is the count of the signal frequency and is unaffected by crossovers due to noise accompanying the signal.

The preceding description of operation is predicated upon the signal in the quadrature channel leading the signal in the signal channel by 90°. If the signal in the quadrature channel had lagged the signal in the other channel by 90°, the pulses in the "B" time periods would be processed instead of the pulses in the "A" time periods, but the same frequency count would result with the pulses appearing at terminal 36 and nothing appearing at the other output terminal. Such a condition would have resulted had the signal in FIG. 3 been below the reference frequency $f_c$ instead of above it. Thus, in addition to improving the signal to noise capability of the conventional axis-crossing counter, the quadrature axis-crossing counter acts as a sense detector to indicate whether the signal is above or below an IF reference frequency.

While a specific type of pulse differencing device has been described, it should be understood that that device is not an invention of the patentee. Such devices are well known in the electronics art. Indeed, other and varied types of pulse differencing devices may be employed in lieu of the specific device here described.

Modifications of the embodiment of the invention depicted in the drawings may be made without departing from the essential concept of the invention and, indeed, are apparent to those skilled in the electronics art. It is intended, therefore, that the invention not be limited to the precise arrangement illustrated, but rather that the invention's scope be construed as delimited by the appended claims.

What is claimed is:

1. An axis-crossing counter comprising: means for deriving from an input signal an identical signal shifted in phase relative to the input signal, means applying the input signal to a first signal channel, means applying the phase shifted signal to a second signal channel, means in the second channel for obtaining gating signals from the phase shifted signal, means in the first channel for deriving pulses at the axis crossings of the input signal, means applying pulses representing positive slope axis crossings of the input signal to a first gate, means applying pulses representing negative slope axis crossings of the input signal to a second gate, the first and second gates being enabled by the gating signals from the second channel to pass the applied pulses to the inputs of a pulse differencing device.

2. An axis-crossing counter comprising: first and second signal channels, means for deriving from the input signal an identical signal shifted in phase relative to the input signal, means applying the input signal to the first signal channel, means applying the phase shifted signal to the second signal channel, means in the second channel for deriving gating signals from the phase shifted signal, means in the first channel for deriving pulses at the axis crossings of the input signal, first and second gates, a pulse differencing device, means applying to the first gate the pulses representing positive slope axis crossings of the input signal, and means applying to the second gate the pulses representing negative slope axis crossings of the input signal, the first and second gates being enabled by the gating signals from the second channel to pass the applied pulses to the inputs of the pulse differencing device.

3. An axis-crossing counter comprising: first and second signal channels, each channel having a symmetrical limiter whose output is applied to a Schmitt trigger circuit, means for deriving from an input signal an identical signal in phase quadrature to the input signal, means applying the input signal to the first channel's input, means applying the quadrature signal to the second channel's input, means coupled to the output of the first channel's Schmitt trigger circuit for deriving pulses at the axis crossings of the input signal, first and second gates having inputs simultaneously enabled or inhibited by the output of the second channel's Schmitt trigger circuit, a pulse differencing device, each gate having its output connected to a different input of the pulse differencing device, and means applying to the first gate the pulses representing positive slope axis crossing of the input signal and applying to the second gate the pulses representing the negative slope axis crossings of the input signal.

4. An axis-crossing counter comprising: first and second signal channels, each channel having a mixer whose output is fed through a filter to a symmetrical limiter and the symmetrical limiter's output being fed into a Schmitt trigger circuit, means applying an input signal to the mixers of both channels, means deriving first and second reference signals having the same frequency but shifted in phase relative to each other by 90°, means applying the first reference signal to the mixer of the first channel, means applying the second reference signal to the mixer of the second channel, first and second gates, each gate having its output connected to a different input of a pulse differencing device, means connecting the output of the first channel's Schmitt trigger circuit to inputs of the first and second gates whereby those gates are simultaneously enabled or inhibited by the Schmitt trigger circuit's output signal, differentiating means connected to the output of the second channel's Schmitt trigger circuit, the differentiating means providing pulses at the axis crossings of the input signal and applying to the first gate the pulses representing positive slope axis crossings and applying to the second gate the pulses representing negative slope axis crossings.

References Cited in the file of this patent

UNITED STATES PATENTS

| | | |
|---|---|---|
| 2,716,189 | Ayres | Aug. 23, 1955 |
| 2,892,945 | Ule | June 30, 1959 |

UNITED STATES PATENT OFFICE
CERTIFICATE OF CORRECTION

Patent No. 3,094,666　　　　　　　　　　　　　　June 18, 1963

Roger S. Smith

It is hereby certified that error appears in the above numbered patent requiring correction and that the said Letters Patent should read as corrected below.

Column 3, line 59, for "heterodying" read -- heterodyning --; column 4, line 23, for "23 corresponds to negative" read -- 22 correspond to positive --.

Signed and sealed this 17th day of December 1963.

(SEAL)
Attest:
ERNEST W. SWIDER

EDWIN L. REYNOLDS

Attesting Officer

Acting Commissioner of Patents